(12) United States Patent
Yamashita et al.

(10) Patent No.: US 8,319,873 B2
(45) Date of Patent: Nov. 27, 2012

(54) SOLID-STATE IMAGING DEVICE (75) Inventors: Hirofumi Yamashita, Kawasaki (JP); Junji Naruse, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 589 days.

(21) Appl. No.: 12/504,136

(22) Filed: Jul. 16, 2009

(65) Prior Publication Data

US 2010/0012993 A1    Jan. 21, 2010

(30) Foreign Application Priority Data

Jul. 18, 2008   (JP) ................................ 2008-187190

(51) Int. Cl.
H04N 5/335   (2011.01)
(52) U.S. Cl. ....................... 348/308; 250/208.1; 257/292
(58) Field of Classification Search .................. 348/308; 250/208.1; 257/292
See application file for complete search history.

(56) References Cited

U.S. PATENT DOCUMENTS

| | | | | |
|---|---|---|---|---|
| 6,107,655 | A * | 8/2000 | Guidash | 257/233 |
| 6,956,605 | B1 * | 10/2005 | Hashimoto | 348/301 |
| 6,977,684 | B1 * | 12/2005 | Hashimoto et al. | 348/294 |
| 2008/0284882 | A1 | 11/2008 | Mori et al. | |
| 2009/0090845 | A1 * | 4/2009 | Yin et al. | 250/208.1 |
| 2009/0194672 | A1 * | 8/2009 | Tredwell et al. | 250/208.1 |

FOREIGN PATENT DOCUMENTS

| | | |
|---|---|---|
| JP | 11-331713 | 11/1999 |
| JP | 2000-59697 | 2/2000 |
| JP | 2004-215048 | 7/2004 |
| JP | 2005-167958 | 6/2005 |

OTHER PUBLICATIONS

Japanese Office Action issued Jan. 17, 2012 in patent application No. 2008-187190 with English translation.

* cited by examiner

*Primary Examiner* — Sinh Tran
*Assistant Examiner* — Paul Berardesca
(74) *Attorney, Agent, or Firm* — Oblon, Spivak, McClelland, Maier & Neustadt, L.L.P.

(57) ABSTRACT

A solid-state imaging device includes a photodiode array having a plurality of photodiodes, read transistors each having one terminal and the other terminal of a current path, one terminal of the current path being connected to one of four photodiodes corresponding to two photodiodes adjacent in a row direction and two photodiodes adjacent in a column direction, the other terminal of the current path being connected in common to a first node, the first node provided as a set of four photodiodes being in a floating-state, read control lines to connect the gate of the read transistor corresponding to each set of the read transistors in common, and independently supplied with a read signal, and vertical signal lines supplied with a signal converted by two photodiodes adjacent in a row direction of the photodiodes for an independent period within one horizontal blanking period of image scanning.

15 Claims, 8 Drawing Sheets

SOLID-STATE IMAGING DEVICE

CROSS-REFERENCE TO RELATED APPLICATIONS

This application is based upon and claims the benefit of priority from prior Japanese Patent Application No. 2008-187190, filed Jul. 18, 2008, the entire contents of which are incorporated herein by reference.

BACKGROUND OF THE INVENTION

1. Field of the Invention

The present invention relates to a solid-state imaging device used for a digital camera and for a digital camera built in a mobile phone. In particular, the present invention relates to a MOS solid-state imaging device.

2. Description of the Related Art

A solid-state imaging device such as a CMOS sensor is, as of today, used for various purposes, that is, for a digital still camera, a digital video movie, and a monitor camera. In the solid-state imaging device, a photodiode is used as a photoelectric conversion element of a pixel. A read circuit is used to read a signal charge from the photodiode. In general, the read circuit includes 3 to 4 MOS transistors per pixel. Therefore, if the pixel size is reduced to make a pixel finer, an area occupied by the photodiode decreases, and thus, the number of saturation electrons for each pixel is reduced. Considering the foregoing circumstances, it is desired to provide a solid-state imaging device, which can prevent a reduction of the number of saturation electrons for each pixel even if the pixel size is reduced.

BRIEF SUMMARY OF THE INVENTION

According to a first aspect of the present invention, there is provided a solid-state imaging device comprising:

a photodiode array having a plurality of photodiodes each making photoelectric conversion, which are arrayed like a matrix;

a plurality of read transistors each having one terminal and the other terminal of a current path, and a gate, one terminal of the current path being connected to each of four photodiodes corresponding to two photodiodes adjacent in a row direction and two photodiodes adjacent in a column direction, the other terminal of the current path being connected in common to a first node, the first node provided as a set of four photodiodes being in a floating-state;

a plurality of read control lines extended in a row direction to connect the gate of the read transistor corresponding to each set of the read transistors in common, and independently supplied with a read signal; and a plurality of vertical signal lines configured to apply a signal photoelectrically converted by two photodiodes adjacent in a row direction of the photodiodes for an independent period within one horizontal blanking period of image scanning.

According to a second aspect of the present invention, there is provided a solid-state imaging device comprising:

a photodiode array having a plurality of photodiodes each making photoelectric conversion, which are arrayed like a matrix;

a plurality of read transistors each having one terminal and the other terminal of a current path, and a gate, one terminal of the current path being connected to each of four photodiodes corresponding to two photodiodes adjacent in a row direction and two photodiodes adjacent in a column direction, the other terminal of the current path being connected in common to a first node, the first node provided as a set of four photodiodes being in a floating-state;

a plurality of read control lines extended in a row direction to connect the gate of the read transistor corresponding to each set of the read transistors in common, and independently supplied with a read signal;

a plurality of vertical signal lines configured to apply a signal photoelectrically converted by two photodiodes adjacent in a row direction of the photodiodes for an independent period within one horizontal blanking period of image scanning; and a row select circuit independently supplying a read signal to the read control lines.

DETAILED DESCRIPTION OF THE INVENTION

Figure 1:
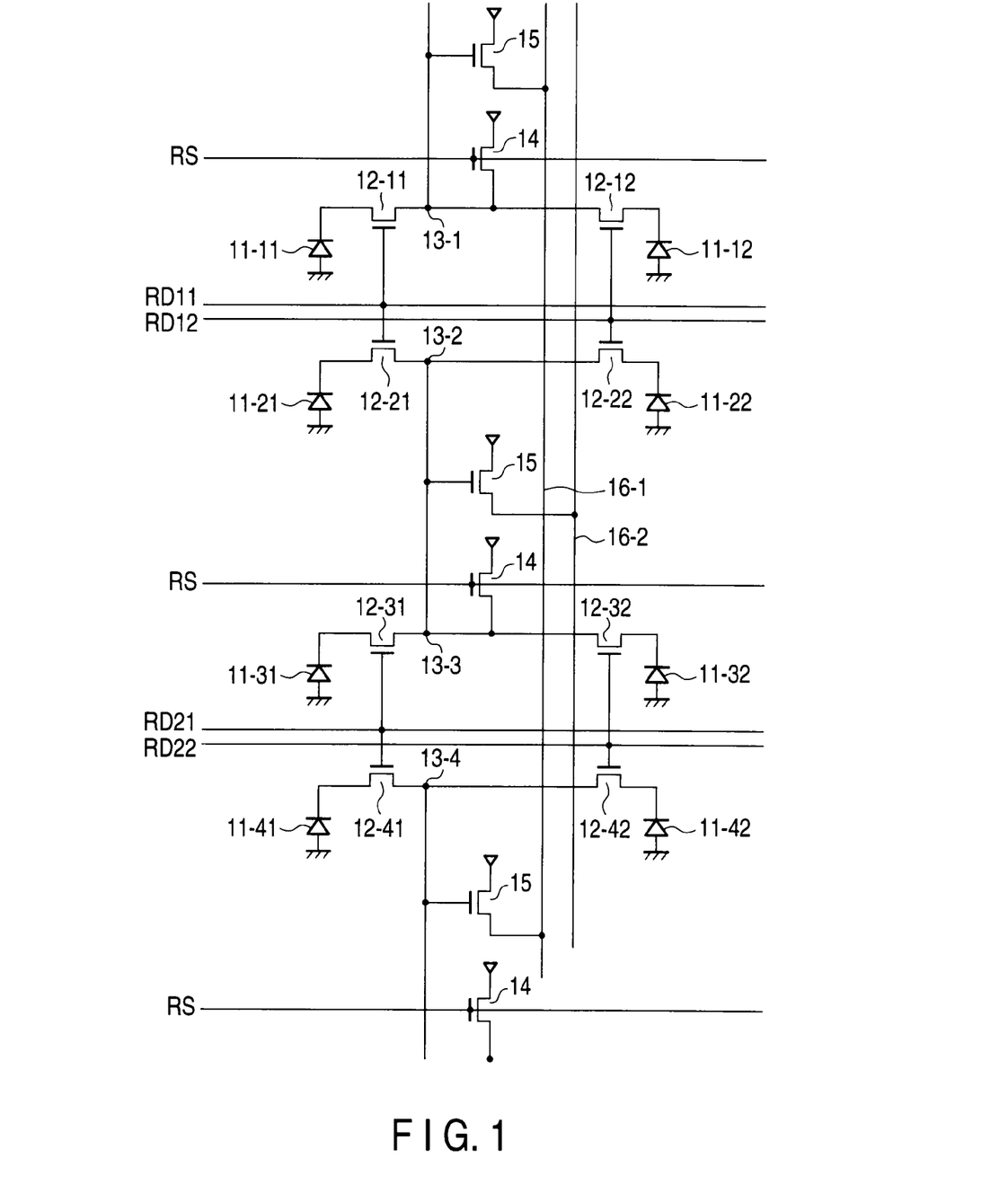
FIG. 1 is a circuit diagram showing the configuration of a solid-state imaging device according to a comparison example.

A comparison example will be explained below before various embodiments of the present invention are described. FIG. 1 is a circuit diagram showing the configuration a pixel array included in a solid-state imaging device according to a comparison example. The solid-state imaging device is disclosed in FIG. 1 of U.S. Patent Application Publication No. US 2008/0284882. In FIG. 1, each of 11-11, 11-12, 11-21, 11-22, 11-31, 11-32, 11-41 and 11-42 denotes a photoelectric conversion element, that is, a photodiode arrayed like a matrix in a pixel array. Each of 12-11, 12-12, 12-21, 12-22, 12-31, 12-32, 12-41 and 12-42 denotes a MOS read transistor having one terminal of a current path connected to each photodiode. Of these MOS read transistors, the other terminals of a current path of two MOS read transistors adjacent in the row direction are connected in common. Two common connection nodes adjacent in the column direction are connected alternately in the column direction. For example, the other terminal common connection node 13-1 of the current path of two MOS read transistors 12-11 and 12-12 is connected to the other terminal common connection node of the current path of two MOS read transistors (not shown) arrayed above in FIG. 1. The other terminal common connection node 13-2 of the current path of two MOS read transistors 12-21 and 12-22 is connected to the other terminal common connection node 13-3 of the current path of two MOS read transistors 12-31 and 12-32. Further, the other terminal common connection node 13-4 of the current path of two MOS read transistors 12-41 and 12-42 is connected to the other terminal common connection node of the current path of two MOS read transistors (not shown) arrayed below in FIG. 1.

Of the MOS read transistors, gates of MOS read transistors 12-11 and 12-21 are connected in common to a read control line RD11 extended in the row direction. Gates of MOS read transistors 12-12 and 12-22 are connected in common to a read control line RD12 extended in the row direction. Gates of MOS read transistors 12-31 and 12-41 are connected in common to a read control line RD21 extended in the row direction. Gates of MOS read transistors 12-32 and 12-42 are connected in common to a read control line RD22 extended in the row direction.

The other terminal common connection node of each of four MOS read transistors is connected to one terminal of a current path of each of reset transistors 14. The other terminal of the current path of the reset transistor 14 is connected to a power supply node. A gate of each reset transistor 14 is connected to the corresponding reset control line RS of reset control lines RS extended in the row direction. The other terminal common connection node of each of four MOS read transistors is connected to each gate of MOS amplification transistors 15. One terminal of a current path of these MOS amplification transistors 15 is connected to a power supply node. The other terminal of the current path of these MOS amplification transistors 15 is connected alternately to different vertical signal lines 16-1 and 16-2 in the column direction.

In the pixel array, the foregoing MOS read transistor 12, reset transistor 14 and MOS amplification transistor 15 form a read circuit for reading a signal from the photodiode 11.

Figure 2:
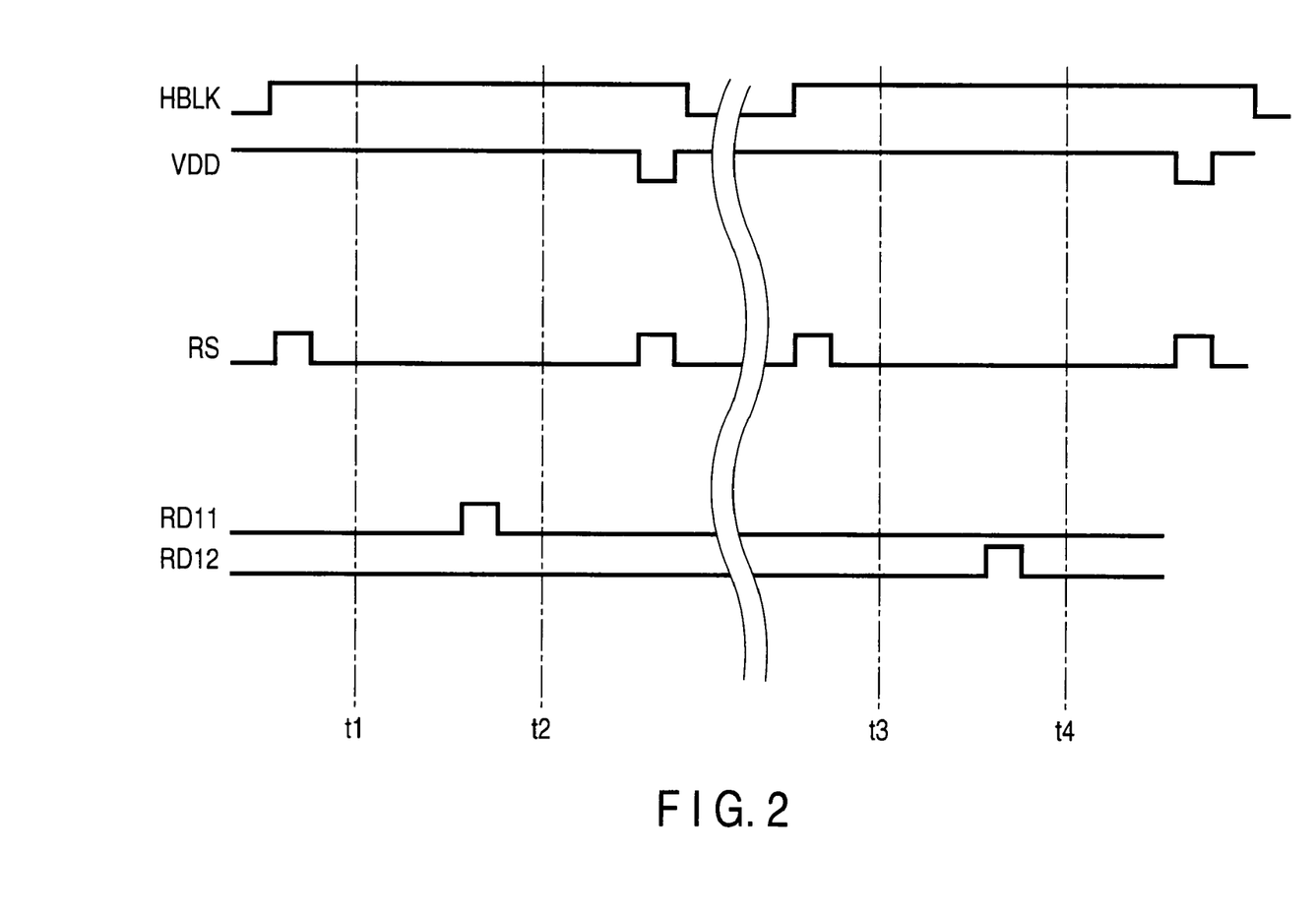
FIG. 2 is a timing waveform chart to explain the operation of the solid-state imaging device shown in FIG. 1.

FIG. 2 is a timing waveform chart to explain the operation of the solid-state imaging device shown in FIG. 1. When an optional row of a photodiode array is in a non-select state, the potential of the power supply node is made low, and simultaneously, the reset transistor 14 is turned on. In this way, the potential of the other terminal common connection node of four MOS read transistors is reduced, and then, the MOS amplification transistor 15 having the gate connected to the node is turned off. When a signal is read from a plurality of photodiodes of a select target row, the potential of the power supply node is made high, and simultaneously, the reset transistor 14 is turned on. In this way, the potential of the other terminal common connection node of four MOS read transistors steps up, and then, the MOS amplification transistor 15 having the gate connected to the node is turned on. For example, when a signal is read from photodiodes 11-11 and 11-12, the potential of the reset control line RS is made high when the potential of the power supply node is high (VDD). In this way, the reset transistor 14 is turned on. In this way, the MOS amplification transistor 15 is turned on, and thereafter, at time t1, a vertical signal line 16-1 is set to a reference signal level for reading a signal from the photodiode 11-11. The potential of the reset control line RS is made low again, and thereafter, the potential of read control line RD11 is made high, thereby turning on the MOS read transistor 12-1. In this way, the signal is read from the photodiode 11-11 to the vertical signal line 16-1, and then, at time t2, the vertical signal line 16-1 is set to the level corresponding to the read signal from the photodiode 11-11. Likewise, at time t3, the vertical signal line 16-1 is set to a reference signal level for reading a signal from the photodiode 11-12, and then, at time t4, vertical signal line 16-1 is set to the level corresponding to the read signal from photodiode 11-12.

In the solid-state imaging device of FIG. 1, 1.5 MOS transistors are arrayed per photodiode in the pixel array; therefore, an area occupied by the photodiode is made large in pixel. In addition, all MOS amplification transistors 15 are simultaneously operated to read a signal to each of vertical signal lines 16-1 and 16-2 at the same time. Therefore, even if the pixel size is reduced, a reduction of the number of saturation electrons is prevented.

Figure 3:
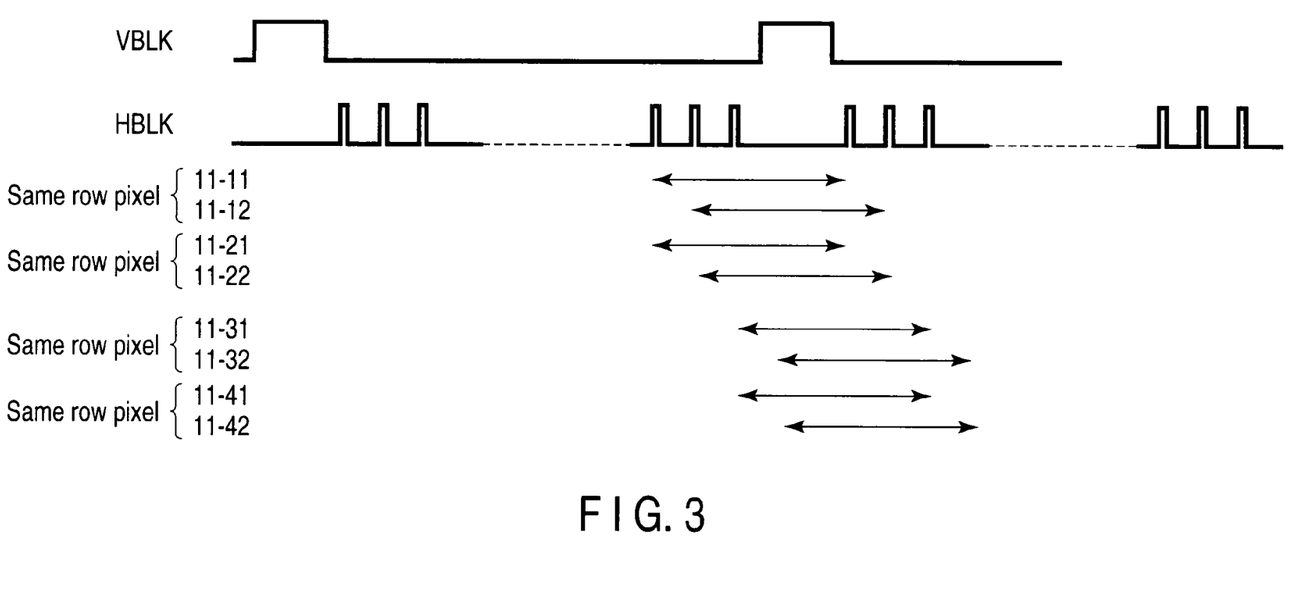
FIG. 3 is a timing waveform chart showing a state that signals stored in photodiodes arrayed in the same row of a pixel array is read for the same horizontal blanking period in the solid-state imaging device shown in FIG. 1.

However, the solid-state imaging device of FIG. 1 has a problem that the image quality of a reproduced screen is reduced as described in the following. Specifically, signals stored in the photodiodes arrayed in the same row of the pixel array are usually read from the pixel array for the same horizontal blanking period (HBLK period). However, as seen from a timing waveform chart shown in FIG. 3, of signal stored in the photodiodes arrayed in the same row, signals of photodiodes arrayed in the different column are read in a different HBLK period. For example, signals are read from two photodiodes 11-11 and 11-12 arrayed in the same row and in the different column at timing one HBLK period shifts. Likewise, signals are read from two photodiodes 11-21 and 11-22 arrayed in the same row and in the different column at timing one HBLK period shifts. If a moving subject is imaged, a signal storage period is different between a pixel arrayed in the odd column and a pixel arrayed in the even column. For this reason, image distortion occurs on a reproduction screen. In particular, according to the condition of imaging a bright subject, an electronic shutter operates, and when a signal storage period reaches 1 to several tens of horizontal periods, a blur of the profile of the subject edge becomes further vivid; as a result, an unnatural screen is reproduced.

Namely, in the solid-state imaging device of FIG. 1, the area of the photodiode is made large in a pixel, and the number of saturation electrons is maintained in a fine pixel reducing the pixel size. However, even if the device of FIG. 1 has the foregoing advantages, when the signal storage period shifts by one horizontal period for each column, the following problem arises. Specifically, when a moving subject is imaged, the edge of a subject is notched; for this reason, the subject distorts. As a result, the image quality of a reproduced screen is reduced.

Various embodiments of the present invention will be hereinafter described. In the following description, the same numerals are used to designate portions common to all drawings.

First Embodiment

Figure 4:
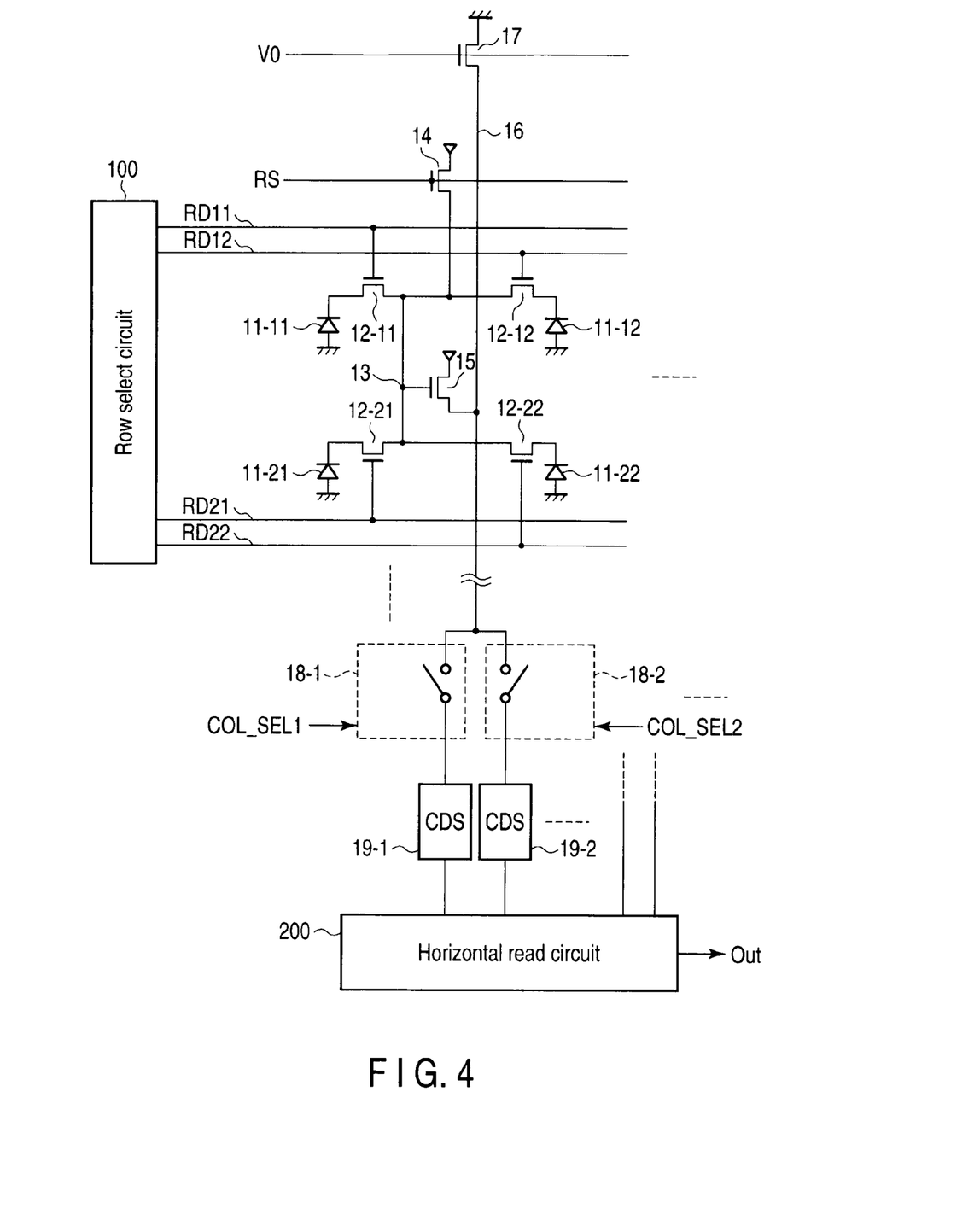
FIG. 4 is a circuit diagram showing the configuration of a solid-state imaging device according to a first embodiment of the present invention.

FIG. 4 shows a configuration of a part of a pixel array and a control circuit of a solid-state imaging device according to a first embodiment of the present invention. In FIG. 4, a 2-row×2-column pixel array is shown in a pixel array. According to the foregoing 2-row×2-column pixel array, one read circuit is located with respect to four pixels including two pixels adjacent in the row direction and two pixels adjacent in the column direction. In FIG. 4, each of 11-11, 11-12, 11-21 and 11-22 denotes a photoelectric conversion element, that is, a photodiode. Each of 12 11, 12-12, 12-21 and 12-22 denotes a MOS read transistor having one terminal of a current path connected to one photodiode. The other terminal of the current path of these four MOS read transistors 12 11, 12-12, 12-21 and 12-22 is connected in common to a node 13. The node 13 is in a floating state.

A gate of the MOS read transistor 12-11 and gates of the corresponding MOS read transistors in other pixels arrayed in the same row are connected in common to a read control line RD11 extending to the row direction. A gate of the MOS read transistor 12-12 and gates of the corresponding MOS read transistors in other pixels arrayed in the same row are connected in common to a read control line RD12 extending to the row direction. A gate of the MOS read transistor 12-21 and gates of the corresponding MOS read transistors in other pixels arrayed in the same row are connected in common to a read control line RD21 extending to the row direction. Likewise, a gate of the MOS read transistor 12-22 and gates of the corresponding MOS read transistors in other pixels arrayed in the same row are connected in common to a read control line RD22 extending to the row direction. The foregoing read control lines RD11, RD12, RD21 and RD22 are independently driven by a row select signal for signal read output from a row select circuit 100 including a vertical register circuit.

The foregoing node 13 is connected to one terminal of a current path of each reset transistor 14. The other terminal of a current path of each reset transistor 14 is connected to a power supply node. A gate of each reset transistor 14 is connected in common to the corresponding line of a plurality of reset control lines RS extended to the row direction at a unit of the row. Each node 13 is connected to each gate of MOS amplification transistors 15. One terminal of a current path of each MOS amplification transistor 15 is connected to a power supply node. The other terminal of the current path of each MOS amplification transistor 15 is connected to the corresponding line of a plurality of vertical signal lines 16. A current source, that is, a plurality of MOS load transistors 17 are connected between one terminal of the vertical signal lines 16 and a ground potential node. Each gate of the MOS load transistors 17 is supplied with a fixed potential V0. The other terminal of each vertical signal line 16 is connected to two select circuits 18-1 and 18-2 forming a column select circuit. These two select circuits 18-1 and 18-2 are selected within one horizontal blanking period of signal scanning by a signal scan circuit. Further, two select circuits 18-1 and 18-2 are connected to a horizontal read circuit 200 via correlated double sampling (CDS) circuits 19-1 and 19-2, respectively.

Figure 5:
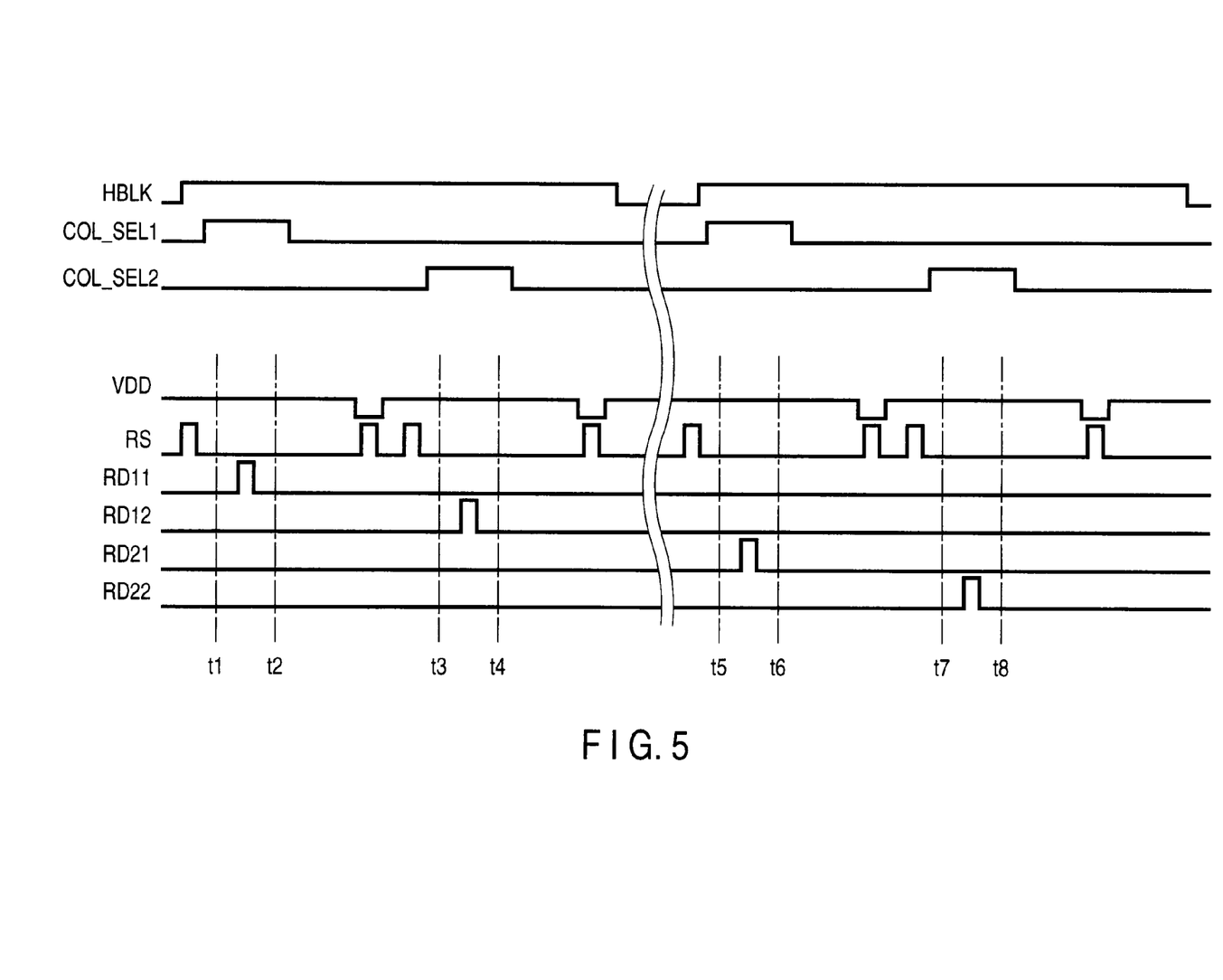
FIG. 5 is a timing waveform chart to explain the operation of the solid-state imaging device shown in FIG. 4.

FIG. 5 is a timing waveform chart to explain the operation of the solid-state imaging device shown in FIG. 4. When the potential of the power supply node is high (VDD) at the beginning of a horizontal blanking (HBLK) period, the potential of the reset control line RS is made high, thereby turning on the reset transistor 14. In this way, the MOS amplification transistor 15 is turned on, and thereafter, at time t1, the vertical signal line 16 is set to a reference signal level for reading a signal from the photodiode 11-11. Thereafter, the potential of the reset control line RS is made low again, and thereafter, the potential of the read control line RD11 is made high, thereby turning on the MOS read transistor 12-11. In this way, the signal is read from the photodiode 11-11 to the vertical signal line 16, and at time t2, the vertical signal line 16 is set to the level corresponding to the read signal from the photodiode 11-11. For a continuous period including times t1 and t2, a column select signal COL-SEL1 is made high, thereby selecting and driving the select circuit 18-1 so that the signal of the vertical signal line 16 is captured in the CDS circuit 19-1.

When the potential of the power supply node is high for the same HBLK period, the potential of the reset control line RS is made high, thereby turning on the reset transistor 14. In this way, the MOS amplification transistor 15 is turned on, and thereafter, at time t3, the vertical signal line 16 is set to a reference signal level for reading a signal from the photodiode 11-12. Thereafter, the potential of the reset control line RS is made low again, and thereafter, the potential of read control line RD12 is made high, thereby turning on the MOS read transistor 12-12. In this way, the signal is read from the photodiode 11-12 to the vertical signal line 16, and at time t4, the vertical signal line 16 is set to the level corresponding to the read signal from the photodiode 11-12. For a continuous period including times t3 and t4, a column select signal COL-SEL2 is made high, thereby selecting and driving the select circuit 18-2 so that the signal of the vertical signal line 16 is captured in the CDS circuit 19-2.

Two CDS circuits 19-1 and 19-2 take the difference between the reference signal level captured and held first and the read signal level captured later, and then hold the obtained difference. The foregoing operation is carried out, and thereafter, the horizontal blanking period ends. For a horizontal read period following the foregoing period, a signal equivalent to one row held in each of two CDS circuits 19-1 and 19-2 is successively read by the horizontal read circuit 200.

Hereinafter, the same operation is repeated in the following manner. Specifically, for a continuous period including times t5 and t6 the reference signal level of the vertical signal line 16 and a read signal from the photodiode 11-21 are captured in the CDS circuit 19-1. For a continuous period including times t7 and t8, the reference signal level of the vertical signal line 16 and a read signal from the photodiode 11-22 are captured in the CDS circuit 19-2. The foregoing operation is carried out, and thereafter, the horizontal blanking period ends. For a horizontal read period following the foregoing period, a signal equivalent to one row held in each of two CDS circuits 19-1 and 19-2 is successively read by the horizontal read circuit 200.

Figure 6:
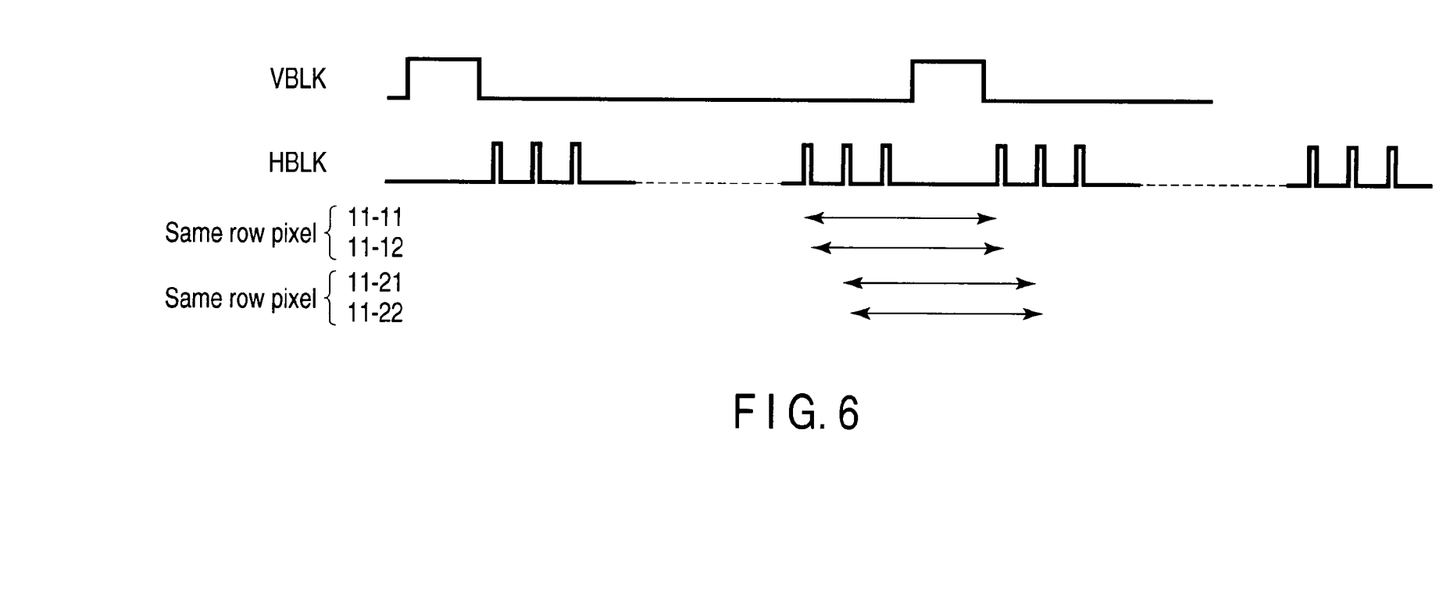
FIG. 6 is a timing waveform chart showing a signal storage period of each pixel in the solid-state imaging device shown in FIG. 4.

FIG. 6 shows a signal storage period of each pixel in the operation described in FIG. 5. According to this embodiment, one-row signals of the photodiodes are read in a state of being divided into two for one HBLK period. Therefore, the difference of the signal storage period of the same row is very slight. This serves to solve the following problem that a blur of the profile of the subject edge occurs for each column, and thus, an unnatural screen is reproduced even if a moving subject is imaged.

For example, in a CMOS area sensor having about five-million pixels, the number of rows in a pixel array is 2048. For example, if 7.5 frames are imaged per second, a horizontal blanking period between adjacent rows is 32.6 μs. In contrast, according to the foregoing operation described in FIG. 5, when signal read is carried out two times for one HBLK period, a read period is about 1.6 μs. Therefore, the read period of adjacent two pixels in the same row is shortened to about 1/40 of the conventional read period.

According to the foregoing embodiment, row-direction two pixels×column-direction two pixels, that is, four photodiodes share one read circuit. Therefore, 1.5 MOS transistors are located per photodiode. This serves to reduce an area occupied by one photodiode, and to prevent a reduction of the number of saturation electrons even if the pixel size is reduced.

According to this embodiment, read control lines RD11, RD12, RD21 and RD22 connected to gates of MOS read transistors 12-11, 12-12, 12-21 and 12-22 connected corresponding to four photodiodes 11-11, 11-12, 11-21 and 11-22 sharing one read circuit are independently provided. These read control lines RD11, RD12, RD21 and RD22 are independently supplied with a row select signal from the row select circuit 100. In this way, a signal of the photodiode arrayed in the different row is read for independent periods. Moreover, a signal of the photodiode arrayed in the same row is read in time division for one horizontal blanking period. Therefore, it is possible to solve the problem of the solid-state imaging device of the comparison example that image distortion occurs on a reproduced screen when a moving subject is imaged.

Second Embodiment

The solid-state imaging device of the first embodiment executes a row select operation by supplying a pulse voltage to the power supply node without providing a MOS row select transistor for selecting a row. Specifically, when a row is in a non-select state, the potential of the power supply node is made low, and simultaneously, the reset transistor is turned on. In this way, the potential of the node 13 is reduced, and the MOS amplification transistor 15 is turned off, thereby putting the corresponding row in a non-select state. Conversely, when a row is in a select state, the potential of the power supply node is made high, and simultaneously, the reset transistor 14 is turned on, thereby stepping up the potential of the node 13. In this way, the MOS amplification transistor 15 is turned on, thereby putting the corresponding row in a select state.

In contrast, a solid-state imaging device of the second embodiment is additionally provided with a MOS row select transistor 20 for each read circuit. Specifically, as seen from FIG. 7, the MOS row select transistor 20 is located for each read circuit provided in common to four pixels including two pixels adjacent in the row direction and two pixels adjacent in the column direction. One terminal of a current path of the MOS row select transistor 20 is connected to the other terminal of a current path of the MOS amplification transistor 15. The other terminal of a current path of the MOS row select transistor 20 is connected to a vertical signal line 16. The gate of the MOS row select transistor 20 is connected in common to the corresponding line of a plurality of row select lines ROSELi (i=1, 2, 3, . . . ) extending to the row direction at a unit of the row. The foregoing row select lines ROSELi are independently driven according to a row select signal for selecting a pixel row output from the row select circuit 100.

Figure 7:
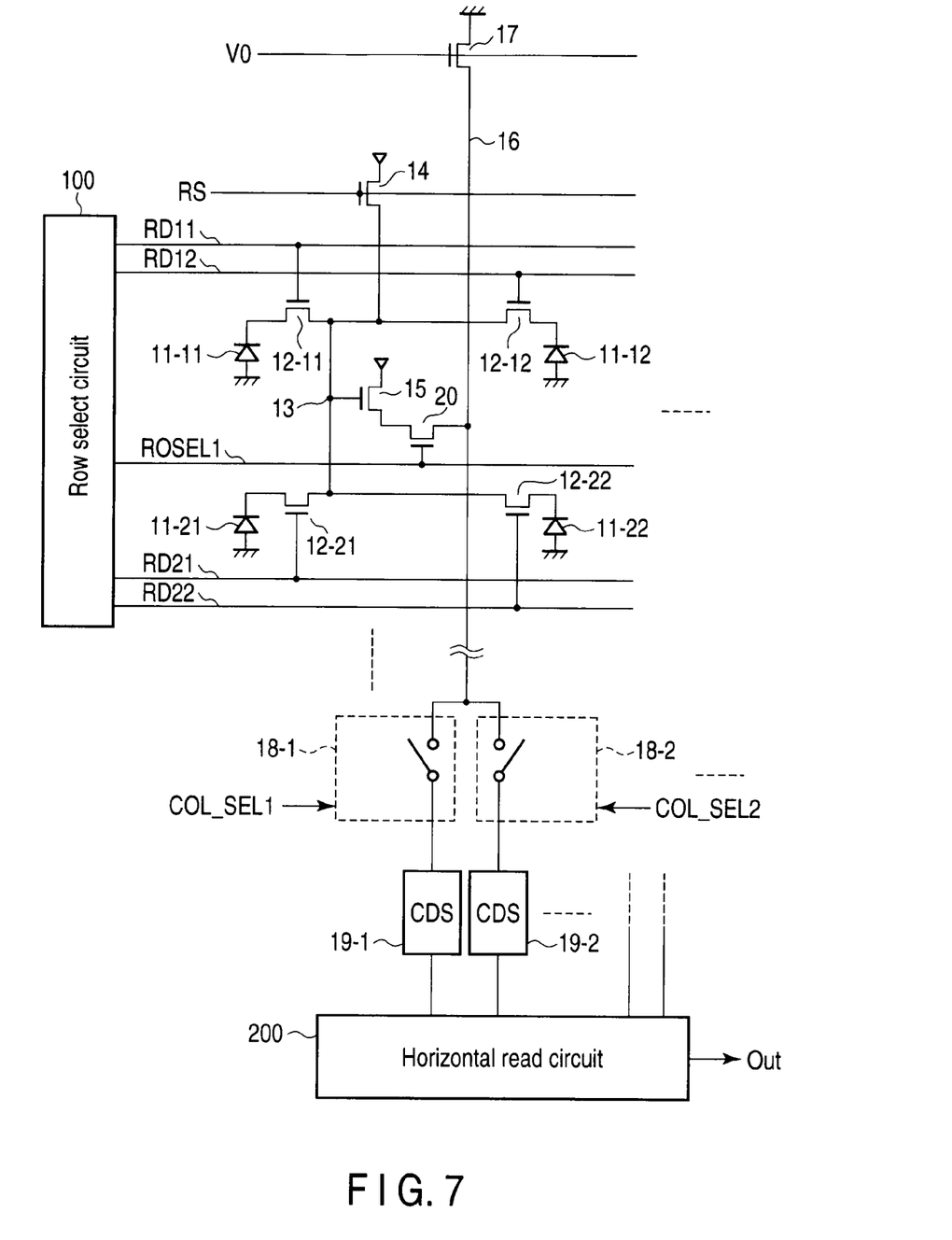
FIG. 7 is a circuit diagram showing the configuration of a solid-state imaging device according to a second embodiment of the present invention.
Figure 8:
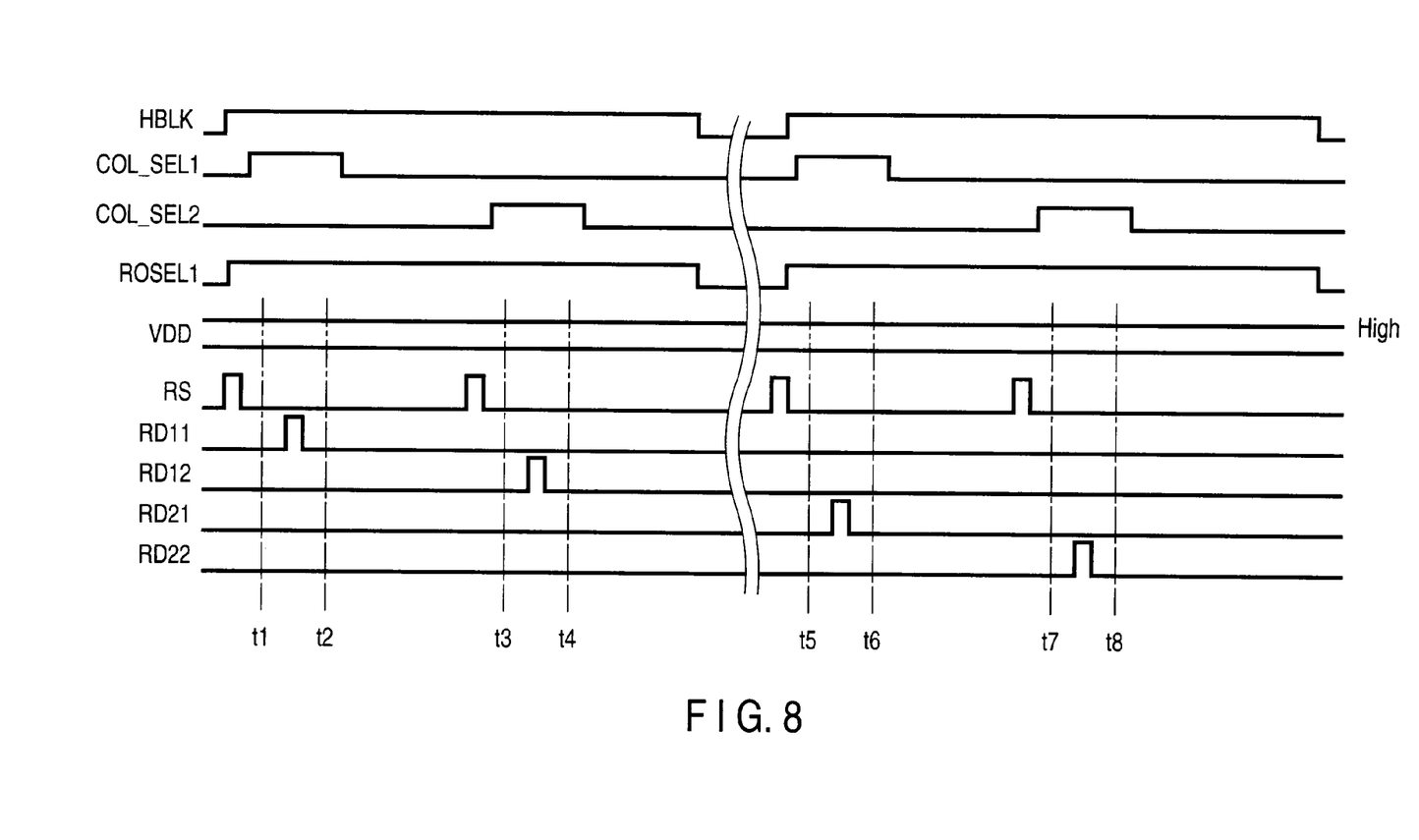
FIG. 8 is a timing waveform chart to explain the operation of the solid-state imaging device shown in FIG. 7.

FIG. 8 is a timing waveform chart to explain the operation of the solid-state imaging device shown in FIG. 7. FIG. 8 differs from the timing waveform chart shown in FIG. 5 according to the first embodiment in that a power supply node is always kept high (VDD). Specifically, the MOS row select transistor 20 corresponding to a non-select state row is supplied from the low row select line ROSELi, thereby turning off the MOS row select transistor 20. Therefore, the MOS amplification transistor 15 of the corresponding row is separated from the vertical signal line 16. Conversely, the MOS row select transistor 20 corresponding to a select state row is supplied from the high row select line ROSELi, thereby turning on the MOS row select transistor 20. Therefore, the MOS amplification transistor 15 of the corresponding row is connected to the vertical signal line 16.

In the solid-state imaging device of the second embodiment, 1.75 MOS transistors are arrayed per photodiode. Therefore, an area occupied by one photodiode is slightly small compared with the case of the first embodiment. However, there is no need to supply a pulse voltage to the power supply node, and the high potential (VDD) is always supplied; therefore, the solid-state imaging device of the second embodiment is suitable for high-speed operation.

What is claimed is:

1. A solid-state imaging device comprising:
a photodiode array having a plurality of photodiodes each making photoelectric conversion, which are arrayed in rows and columns;
a plurality of read transistors provided in one-to-one correspondence with the plurality of photodiodes, making a plurality of sets each comprised of four photodiodes of the plurality of photodiodes and four read transistors of the plurality of the read transistors coupled to the four photodiodes, respectively, and placed adjacent to each other in a direction of the rows and in a direction of the columns, and each of plurality of read transistors having one terminal and the other terminal of a current path, and a gate, and the one terminal of the current path being connected to a corresponding one of the photodiodes, the other terminal of the current path of any one of the four read transistors being connected in common to a first node, the first node being in a floating-state;
a plurality of read control lines extended in the direction of the rows to which the four read transistors are respectively and correspondingly connected through the gate of each of the four read transistors, and independently supplied with a read signal;
a plurality of vertical signal lines configured to output signals photoelectrically converted by two photodiodes of the plurality of photodiodes included in one of the sets and adjacent in the direction of the rows for an independent period within one horizontal blanking period of image scanning;
a plurality of column select circuits connected to the vertical signal lines, respectively, and each selecting signals of a corresponding one of the vertical signal lines to output two signals, each of the column select circuits selecting signals of the corresponding one of the vertical signal lines to output the two signals within the one horizontal blanking period of the image scanning; and
a plurality of pairs of correlated double sampling circuits respectively provided for each of the vertical signal lines, the pair of correlated double sampling circuits receiving the two signals from a corresponding one of the column select circuits, each of the correlated double sampling circuits obtaining a difference between a reference signal level which is held first and a read signal level captured later, and holding the obtained difference.

2. The device according to claim 1, further comprising:
a plurality of reset transistors each having one terminal and the other terminal of a current path, and a gate, the one terminal of the current path being connected to the first node, the other terminal of the current path being connected to a power supply node; and
a plurality of reset control lines extending in the direction of the rows, each connected to the gate of each of the reset transistors at a unit of in a row, and each supplied with a reset signal.

3. The device according to claim 2, wherein each of the reset control lines is supplied with the reset signal before reading the photoelectrically converted signals from the four photodiodes included in one of the sets.

4. The device according to claim 2, wherein the power supply node is supplied with a reference potential in synchronism with the reset signal before reading the photoelectrically converted signals from the four photodiodes included in one of the sets.

5. The device according to claim 1, further comprising:
a plurality of amplification transistors provided in one-to-one correspondence with each of the sets, each of the amplification transistors having one terminal and the other terminal of a current path, and a gate, the gate being connected to the first node, the one terminal of the current path being connected to a power supply node, the other terminal of the current path being connected to a corresponding one of the vertical signal lines.

6. The device according to claim 1, further comprising:
a plurality of amplification transistors provided in one-to-one correspondence with each of the sets, each of the amplification transistors having one terminal and the other terminal of a current path, and a gate, the gate being connected to the first node, and the one terminal of the current path being connected to a power supply node;
a plurality of row select transistors each having one terminal and the other terminal of a current path, and a gate, the one terminal of the current path being connected to the other terminal of a current path of a corresponding one of the amplification transistors, the other terminal of the current path being connected to a corresponding one of the vertical signal lines; and
a plurality of row select lines extending in the direction of the rows, each being connected to the gate of a corresponding one of the row select transistors, and each being supplied with a row select signal.

7. The device according to claim 6, wherein the power supply node is supplied with a fixed power supply potential.

8. A solid-state imaging device comprising:
a photodiode array having a plurality of photodiodes each making photoelectric conversion, which are arrayed in rows and columns;
a plurality of read transistors provided in one-to-one correspondence with the plurality of photodiodes, making a plurality of sets each comprised of four photodiodes of the plurality of photodiodes and four read transistors of the plurality of the read transistors coupled to the four photodiodes, respectively, and placed adjacent to each other in a direction of the rows and in a direction of the columns, and each of plurality of read transistors having one terminal and the other terminal of a current path, and a gate, the one terminal of the current path being connected to a corresponding one of the photodiodes coupled to the four read transistor, respectively, the other terminal of the current path being connected to a first node, the first node being in a floating-state;
a plurality of read control lines extended in the direction of the rows to which the gate of a corresponding one of the four read transistors is connected, and independently supplied with a read signal;
a plurality of vertical signal lines configured to output signals photoelectrically converted by two photodiodes of the plurality of photodiodes included in one of the sets and adjacent in the direction of the rows for an independent period within one horizontal blanking period of image scanning;
a plurality of column select circuits connected to the vertical signal lines, respectively, and each selecting signals of a corresponding one of the vertical signal lines to output two signals, each of the column select circuits selecting signals of the corresponding one of the vertical signal lines to output the two signals within the one horizontal blanking period of the image scanning; and
a plurality of pairs of correlated double sampling circuits respectively provided for each of the vertical signal lines, the pair of correlated double sampling circuits receiving the two signals from a corresponding one of the column select circuits, each of the correlated double sampling circuits obtaining a difference between a reference signal level which is held first and a read signal level captured later, and holding the obtained difference; and
a row select circuit independently supplying a read signal to the read control lines.

9. The device according to claim 8, further comprising:
a plurality of reset transistors each having one terminal and the other terminal of a current path, and a gate, the one terminal of the current path being connected to the first node, the other terminal of the current path being connected to a power supply node; and
a plurality of reset control lines each connected to the gate of each of the reset transistors in a row, and each supplied with a reset signal.

10. The device according to claim 9, wherein each of the reset control lines is supplied with the reset signal before reading the photoelectrically converted signals from the four photodiodes included in the sets.

11. The device according to claim 9, wherein the power supply node is supplied with a reference potential in synchronism with the reset signal before reading the photoelectrically converted signals from the four photodiodes included in the sets.

12. The device according to claim 8, further comprising:
a plurality of amplification transistors provided in one-to-one correspondence with each of the sets, each of the amplification transistors having one terminal and the other terminal of a current path and, and a gate, the gate being connected to the first node, the one terminal of the current path being connected to a power supply node, and the other terminal of the current path being connected to a corresponding one of the vertical signal lines.

13. The device according to claim 8, further comprising:
a plurality of amplification transistors provided in one-to-one correspondence with each of the sets, each of the amplification transistors having one terminal and the other terminal of a current path, and a gate, the gate being connected to the first node, and the one terminal of the current path being connected to a power supply node;
a plurality of row select transistors each having one terminal and the other terminal of a current path, and a gate, the one terminal of the current path being connected to the other terminal of a current path of a corresponding one of the amplification transistors, and the other terminal of the current path being connected to a corresponding one of the vertical signal lines; and
a plurality of row select lines extending in the direction of the rows, each being connected to the gate of a corresponding one of the row select transistors, and each being supplied with a row select signal.

14. The device according to claim 13, wherein the power supply node is supplied with a fixed power supply potential.

15. The device according to claim 13, wherein the row select signal is output from a corresponding one of the row select transistors.

* * * * *